(12) United States Patent
Winterer et al.

(10) Patent No.: US 7,162,038 B1
(45) Date of Patent: Jan. 9, 2007

(54) AUDIO SOURCE SELECTION CIRCUIT

(75) Inventors: Martin Winterer, Gundelfingen (DE);
Stefan Mueller, Freiburg i.Br. (DE);
Thomas Hilpert, Denzlingen (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 09/357,006

(22) Filed: Jul. 19, 1999

(30) Foreign Application Priority Data

Jul. 21, 1998 (EP) .................................. 98113600

(51) Int. Cl.
*H04H 5/00* (2006.01)
*H04H 3/00* (2006.01)
(52) U.S. Cl. .............................. 381/11; 381/80; 381/81
(58) Field of Classification Search ................... 381/2, 381/7, 11, 12, 77, 80, 81, 85, 123; 369/2, 369/5; 700/94
See application file for complete search history.

(56) References Cited

U.S. PATENT DOCUMENTS

| 5,515,442 A | * | 5/1996 | Dombrowski, Jr. ............ 381/11 |
| 5,912,581 A | | 6/1999 | Giebel et al. ................ 327/530 |
| 6,052,471 A | * | 4/2000 | Van Ryzin ................... 381/123 |
| 6,141,646 A | * | 10/2000 | Winterer et al. ............. 704/503 |

FOREIGN PATENT DOCUMENTS

| DE | 32 22 806 | 12/1983 | .................... 5/60 |
| EP | 91106080.4 | 4/1991 | |
| EP | 0 464 328 | 1/1992 | .................... 5/60 |
| JP | 55-128976 | 10/1980 | .................... 5/60 |

OTHER PUBLICATIONS

Abstract of German Patent No. 3222806 A of Derwent Database, Applicant: Loewe Opta Gmbh, Filed on Dec. 29, 1983.
Abstract of Japanese Patent No. 55-128976 of Matsushita Electric Ind Co Ltd., Applicant: Yamada Haruyasu, Filed: Oct. 6, 1980.
Preliminary Data Sheet: MSP 3410D Multistandard Sound Processor, Micronas Intermetall, Jan. 15, 1998 Edition 6251-422-3PD.

* cited by examiner

*Primary Examiner*—Xu Mei
(74) *Attorney, Agent, or Firm*—O'Shea, Getz & Kosakowski, P.C.

(57) ABSTRACT

Audio source selection circuit (QW) for an audio signal processor with inputs for source signals (F1, F2, NA, NB) provided by at least one source (Q1, Q2), with a processing device (V) which forms pairs of signals from the source signals, with a settable source selection logic (Qs) to which the channels of the processing device (V) are applied, and with outputs coupled to signal outputs of the settable source selection logic (Qs) and each forming an output channel (Co1, Co2, Co3), the processing device (V) including an automatic audio mode setting device which generates suitable intermediate channels (Cz1, Cz2, Cz3, Cz4) from the source signals (F1, F2, NA, NB) according to a source- and application-related mode.

4 Claims, 1 Drawing Sheet

AUDIO SOURCE SELECTION CIRCUIT

BACKGROUND OF THE INVENTION

The invention relates generally to the field of signal processing, and in particular to the field of channel source audio selection circuitry for an audio signal processor.

An audio signal processor is described in detail, for example, in a data sheet of Micronas Intermetall, "MSP 3410D Multistandard Sound Processor", Edition Jan. 15, 1998, Order No. 6251-422-3PD. The block diagram shown on page 14 as FIGS. 4–5, "Audio Baseband Processing (DSP Firmware)", includes a block labeled "Channel Source Select", which, in conjunction with the associated circuit blocks, represents one example of such an audio source selection circuit.

In view of the great number of transmission systems for audio signals alone or in combination with television signals, the adaptation of the output channels to the respective type of signal in multistandard equipment is rather complicated. Besides the different audio standards, such as FM, AM, NICAM and other, particularly new standards in connection with digital television, the respective type of signal and the reproducer to be connected have to be taken into account. Both are classed in the following under the term "signal mode". The type of signal indicates whether the audio signals to be reproduced are mono signals, stereo signals, or different language signals. The reproducers can be loudspeakers and headphones. In a broader sense, "reproducers" as used herein also means equipment connected via audio-video interfaces, for example via the well-known "SCART" socket. It is obvious that during direct reproduction via loudspeakers or headphones, A-language signals and B-language signals must never be output in the right-hand and left-hand sound channels simultaneously. On the other hand, it is advantageous if the loudspeakers reproduce the A-language signal, while the B-language signal can be heard over one or more headphones, or vice versa. If the signals are offered with sufficient quality, and stereo signals are present, switching to the latter should take place automatically. In the case of the audio-video interface, which does not directly lead to reproduction, it is advantageous to pass on or store the entire information contained in the audio signals, i.e., the A- and B-language contents, if present. In certain transmission standards, there is a third language channel, for example for linguistic minorities, which is to be reliably selectable as an output channel using an automatic audio source selection circuit.

In the prior-art audio source selection circuits, a source selection logic controlled by a controller is followed by an output matrix for each output channel. This output matrix is also controlled by the controller depending on the type of signal and on the reproducer connected to it. If an audio source provides only a mono signal, for example, the output matrix ensures that the mono signal is on both channel lines. If the audio source provides a stereo signal, the respective output matrix is switched to a transparent state, i.e., both signal components can pass through the output matrix. If the channel lines contain the A-language signal and the B-language signal, the respective output matrix may be switched to the transparent state only if a SCART socket is connected. In the other cases, both channel lines must be switched to either the A-language signal or the B-language signal.

From the foregoing it is apparent that, even if only few variants are taken into account, the setting or programming of the controller becomes very complicated. If the setting is performed in the factory or in a service shop, the effort required for the setting or programming is burdensome, but still feasible. Things are different if the owner of such a piece of multistandard equipment wants to alter the reproduction, for example to interchange the A- and B-language signals between the loudspeaker and headphone connections.

SUMMARY OF THE INVENTION

It is an object of the invention to provide an intelligent audio source selection circuit which performs the necessary switching largely by itself.

Briefly, according to the present invention, the processing device comprises an automatic audio mode setting device which generates suitable intermediate channels from the source signals according to a source- and application-related mode, and feeds the intermediate channels to the settable source selection logic to select at least one of them as the output channel.

For any appropriate reproducer, a separate intermediate channel is formed even if the respective reproducer is not connected or not present. For each of these intermediate channels, the individual settings are then performed automatically in accordance with the possible types of signals. The respective type of signal is identified, for example, by a transmitted identification signal. The user now only has to establish the association between the respective output channel to which the reproducer is connected and the associated intermediate channel. This is easily possible by simple programming, for example in a menu mode, via the remote-control unit.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
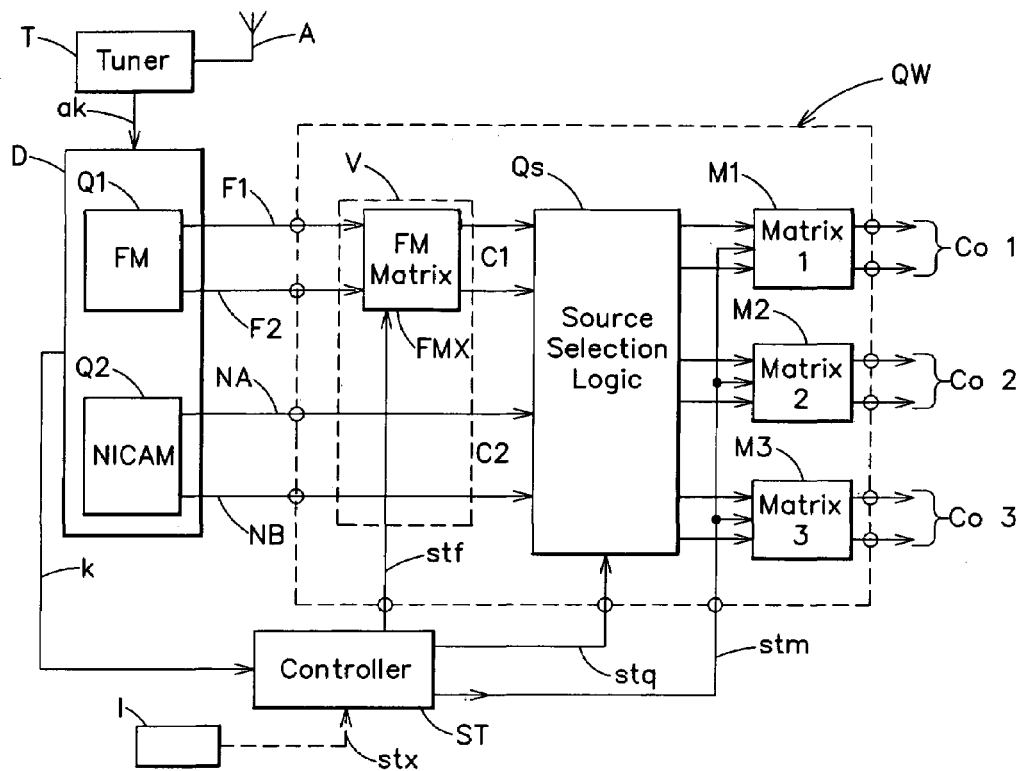
FIG. 1 is a schematic block diagram of a prior art audio source selection circuit.

FIG. 1 shows a prior-art audio source selection circuit QW as is described, for example, in the above-mentioned data sheet as part of an audio signal processor. A tuner T in a television receiver receives from an antenna A a television signal containing the video signal and the audio signal components. The latter are filtered out, digitized, and fed as audio components ak to a demodulator D. The demodulator D contains various devices for demodulating the audio component ak, which can handle the transmission standards used. In the FM standard, the audio information is on a first sound carrier and a second sound carrier, and in the NICAM standard, it is a first frequency-modulated sound carrier and, as digital information, on the NICAM channel proper. Furthermore, there is the AM standard and, particularly in the USA, an FM/AM standard. Further variants and transmission standards, also with regard to digital television, require further demodulators or adaptive demodulators. Each of these demodulators can be conceived as an audio source which provides source signals at its output. In the embodiment shown, the FM demodulator corresponds to a first audio source Q1, and the NICAM demodulator to a second audio source Q2. The signals provided by the first audio source Q1 are the source signals F1, F2, and those provided by the second source Q2 are the two NICAM signals NA, NB. For compatibility reasons, the source signal F1 contains a mono signal; by contrast, the NICAM signals NA, NB contain only separate right and left signals or separate language signals A, B or a mono signal in one channel, the other channel then contains no information.

The type of signals contained in the respective source signals is indicated by an identification signal k which forms part of the audio component ak. This identification signal is evaluated in a controller ST, where it generates control data stf for an FM matrix FMX in a processing device V. The FM matrix forms from the source signals F1, F2 a pair of signals corresponding to a first channel C1, which contains either the transmitted stereo or bilingual information on both lines or the mono signal on one line. The NICAM source signals NA, NB do not require such matrixing, because the two types of channel information are transmitted separately, as mentioned above. They thus form a second channel C2. The processing device V is therefore transparent to the channel C2.

The first and second channels C1, C2 feed a settable source selection logic Qs, which selects from the applied pairs of signals those signals which are to form the output channels Co1, Co2, Co3. If, for example, the right/left loudspeaker pair is to be connected to a first output channel Co1, and bilingual signals A, B, are present, either only the A-language signals or only the B-language signals of the first or second channel C1, C2 may be switched to the loudspeaker pair. This switching is effected in an output matrix M1, for example by switching the signal of one channel line to both outputs of the channel Co1. If the first channel C1 delivers a stereo signal, the output matrix M1 can be switched to a transparent state. Things are similar if headphones are to be connected to the output channel Co2. The necessary switching operations are then performed by a second output matrix M2. If a SCART socket is connected to the third output channel Co3, the associated switching operations are performed by a third output matrix M3. The output matrices are controlled by matrix control data stm from the controller ST.

The settable source selection logic Qs selects either the first channel C1 or second channel C2 and then passes the signal pair of the selected channel to the first, second, and third output matrices M1, M2, M3. The selection of the first or second channel C1, C2 is made via source control data stq from the controller ST. The programming of the controller ST is effected via a programming device I, which may also be a remote-control unit, for example. The control data stx for the programming are stored in the controller ST and, in conjunction with the respective identification signal k, generate the control data stf, stq, stm.

Figure 2:
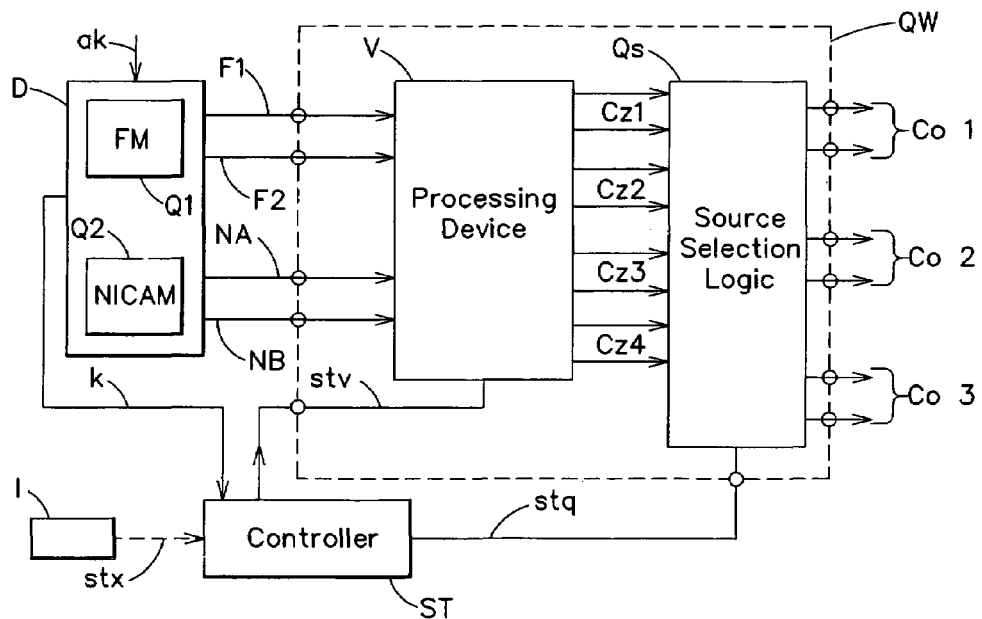
FIG. 2 is a schematic block diagram of one embodiment of an audio source selection circuit according to the present invention.

In FIG. 2, which shows the invention, functional units identical to the functional units of FIG. 1 are designated by like reference characters to show equalities and differences more clearly and to simplify the description. The demodulator D again contains an FM demodulator as a first source Q1 and a NICAM demodulator as a second source Q2. The associated source signals F1, F2, NA, NB are fed to a processing device V which contains an FM matrix FMX (as in FIG. 1, but not shown in FIG. 2) and an automatic audio mode setting device which generates suitable intermediate channels Cz1, Cz2, Cz3, Cz4 from the source signals according to a source- and application-related mode. For any usual mode of reproduction, a separate intermediate channel is made available. Separate intermediate channels are also made available if specific source-side properties have to be taken into account, for example if one of the sources delivers a third language signal. The necessary switching operations in the processing device V are controlled by processing control data stv from the controller ST.

The association and connection between the reproducers connected to the output channels Co1, Co2, Co3 and the appropriate intermediate channels Cz1 to Cz4 are established via a settable source selection logic Qs, as in FIG. 1. Since the intermediate channels already have the correct signal mode, the output matrices M1, M2, M3 of FIG. 1 can be dispensed with. This, as mentioned above, facilitates the programming of the controller ST considerably, particularly if changes are to be made.

Although the present invention has been shown and described with respect to several preferred embodiments thereof, various changes, omissions and additions to the form and detail thereof, may be made therein, without departing from the spirit and scope of the invention.

What is claimed is:

1. An audio source selection circuit for an audio signal processor, comprising:
   a plurality of inputs for source signals provided by at least one audio source;
   a processing device which forms pairs of signals from the source signals, each of said pairs of signals being combined in one channel;
   a settable source selection logic to which the channels of the processing device are fed; and
   outputs coupled to signal outputs of the settable source selection logic and each forming one output channel, where
   said processing device comprises an automatic audio mode setting device which generates suitable intermediate channels from the source signals according to a source- and application-related mode, and feeds the intermediate channels to the settable source selection logic to select at least one of them as the output channel.

2. The audio source selection circuit of claim 1 where a first, a second, a third, and a fourth intermediate channel are provided, and that the mode of the first intermediate channel is predefined particularly for loudspeaker operation and/or a language A, the mode of the second intermediate channel for headphone operation and/or a language B, the mode of the third intermediate channel for the necessary stereo or bilingual signals of an audio-video signal interface, and the mode of the fourth intermediate channel for a reproducer of any third language that may be present.

3. The audio source selection circuit of claim 2, where in the first to the fourth intermediate channels, switching takes place automatically from a mono mode to a stereo mode if the source signals contain stereo signals, and, depending on the intermediate channel, to an A- or B- or A/B-language mode if the source signals contain separate language signals.

4. The audio source selection circuit of claim 1, where in the first to the fourth intermediate channels, switching takes place automatically from a mono mode to a stereo mode if the source signals contain stereo signals, and, depending on the intermediate channel, to an A- or B- or A/B-language mode if the source signals contain separate language signals.

* * * * *